United States Patent
Chien et al.

(10) Patent No.: US 6,760,702 B2
(45) Date of Patent: Jul. 6, 2004

(54) METHOD FOR GENERATING CANDIDATE WORD STRINGS IN SPEECH RECOGNITION

(75) Inventors: Shih-Chieh Chien, Taichung (TW); Sen-Chia Chang, Changhua (TW)

(73) Assignee: Industrial Technology Research Institute, Hsinchu (TW)

( * ) Notice: Subject to any disclaimer, the term of this patent is extended or adjusted under 35 U.S.C. 154(b) by 424 days.

(21) Appl. No.: 09/907,678

(22) Filed: Jul. 19, 2001

(65) Prior Publication Data

US 2002/0143536 A1 Oct. 3, 2002

(30) Foreign Application Priority Data

Feb. 21, 2001 (TW) ........................................ 90103983 A

(51) Int. Cl.[7] ............................................. G10L 15/04
(52) U.S. Cl. ....................... 704/251; 704/251; 704/252; 704/257
(58) Field of Search .................. 704/4, 9, 10, 246, 704/208, 248, 253, 259, 251, 236, 232, 256; 701/202

(56) References Cited

U.S. PATENT DOCUMENTS

| | | | |
|---|---|---|---|
| 5,241,619 A | | 8/1993 | Schwartz et al. ............. 395/2 |
| 5,719,997 A | * | 2/1998 | Brown et al. ............... 704/257 |
| 5,805,772 A | | 9/1998 | Chou et al. ................ 395/2.64 |
| 5,884,259 A | * | 3/1999 | Bahl et al. .................. 704/252 |
| 5,987,409 A | | 11/1999 | Tran et al. .................. 704/240 |
| 6,453,315 B1 | * | 9/2002 | Weissman et al. ............. 707/5 |

OTHER PUBLICATIONS

Frank K. Soong and Eng–Fong Huang; "A Tree—Trellis Based Fast Search for Finding the N Best Sentence Hypotheses in Continuous Speech Recognition"; 1999 IEEE; pp. 705–708.

Eng–Fong Huang and Hsiao—Chuan Wang; "An Efficient Algorithm for Syllable Hypothesization in Continuous Mandarin Speech Recognition"; 1994 IEEE; pp. 446–449.

Stefan Ortmanns, Hermann Ney and Xavier Aubert; "A Word Graph Algorithm for Large Vocabulary Continous Speech Recognition"; 1997; Computer Speech and Language; pp. 43–72.

* cited by examiner

Primary Examiner—Doris H. To
Assistant Examiner—Huyen Vo
(74) Attorney, Agent, or Firm—Bacon & Thomas, PLLC

(57) ABSTRACT

A method for generating candidate word strings in speech recognition is provided, which is based on the nodes in the word lattice to search candidate word strings. The associated maximum string score for each node is first determined. Next, all nodes are sorted based on the associated maximum string score to group the nodes with the same string score into the same node set. Then, the node sets with relative high string scores are selected to connect the nodes by their starting time frame and ending time frame, thereby generating the candidate word strings.

12 Claims, 6 Drawing Sheets

| (Starting Time Frame, Ending Time Frame) | Word Content | Associated Maximum String Score | Node Index |
|---|---|---|---|
| Node Set 1 | | | |
| (0, 10) | Silence | −524 | n1 |
| (11, 64) | Doubt | −524 | n2 |
| (65, 150) | Weather | −524 | n3 |
| (151, 300) | Today | −524 | n4 |
| Node Set 2 | | | |
| (0, 7) | Silence | −527 | n5 |
| (8, 64) | About | −527 | n6 |
| Node Set 3 | | | |
| (8, 64) | South | −532 | n9 |
| Node Set 4 | | | |
| (65, 160) | Wet | −584 | n7 |
| (161, 300) | Day | −584 | n8 |

FIG. 3

METHOD FOR GENERATING CANDIDATE WORD STRINGS IN SPEECH RECOGNITION

BACKGROUND OF THE INVENTION

1. Field of the Invention

The present invention relates to the field of speech recognition and, more particularly, to a node-based method for generating candidate word strings in speech recognition without expanding the strings.

2. Description of Related Art

To achieve a higher recognition accuracy, the output of a speech recognition module is not only a single recognition result, instead, a plurality of possible results are provided so that a subsequent process may select a best one therefrom in current speech recognition system.

Therefore, a speech recognition module must provide many possible results to the subsequent process. Accordingly, the generation of a plurality of candidate word strings from a speech signal for the subsequent process is a major concern in developing the speech recognition system.

U.S. Pat. No. 5,241,619 discloses a method for searching candidate word strings in which N candidate word strings are maintained during a matching process of speech signals and words. The N candidate word strings are obtained after the matching process. In such a method, the N candidate word strings maintained previously have to be expanded and modified for each time frame. If there are M words in vocabulary, as shown in FIG. 6, there will be M new candidate word strings generated when a candidate word string is expanded. The best N candidate word strings are selected from all expanded candidate word strings for being used as a basis for the expansion in the next time frame. In this manner, a large memory space is required to store expanded candidate word strings, and a sorting must be performed for each time frame to maintain N possible candidate word strings.

Another approach for candidate word strings search is implemented in a two-stage design. In the first stage, a modified Viterbi algorithm is employed to generate a word lattice from input speech signal. In the second stage, a stack search is used to generate the candidate word string by tracing back the word lattice generated in the first stage. The detailed description of such method can be found in U.S. Pat. No. 5,805,772, entitled "Systems, Methods and Architecture of Manufacture for Performing High Resolution N-best String Hypothesization" and "A Tree-trellis Based Fast Search for Finding the N Best Sentence Hypotheses in Continuous Speech Recognition" by F. K. Soong and E. F. Huang, ICASSP'91, pp. 705–708, 1991, which are hereby incorporated by reference into this patent application. As known, this method must continuously perform stack operations, such as push and pop, for expanding word strings in order to obtain possible candidate word strings. This method inevitably spends much time on the expanding of candidate word strings.

Still another method for searching candidate word strings is implemented in a two-stage design similar to above method. In the first stage, 408 Mandarin syllables are used as recognition units for generating syllable lattice. In the second stage, N-best syllables are selected for back-tracing operation with the use of the stack search in order to generate a plurality of candidate word strings. A detailed description of such a method can be found in "An Efficient Algorithm for Syllable Hypothesization in Continuous Mandarin Speech Recognition" by E. F. Huang and H. C. Wang, IEEE transactions on speech and audio processing, pp. 446–449, 1994, which is incorporated herein by reference.

A further method for searching candidate word strings is also implemented in a two-stage design, in which a word graph algorithm is employed to generate the word graph and a best word string in the first stage. The detailed description can be found in "A Word Graph Algorithm for Large Vocabulary Continuous Speech Recognition" by S. Ortmanns, H. Ney, and X. Aubert, Computer Speech and Language, pp. 43–72, 1997, which is incorporated herein by reference. In the second stage, the searching for candidate word strings is performed on the nodes of the best word string. The output is recorded in a tree structure for saving memory space. A detailed description of this method can be found in U.S. Pat. No. 5,987,409, entitled "Method of and Apparatus for Deriving a Plurality of Sequences of Words From a Speech Signal", which is incorporated herein by reference.

Basically, the above methods perform searching operations based on the expansion of word strings. Such operation requires a large memory space to store word strings, and spends a lot of time for to expand word strings. Therefore, it is desired to make an improvement on the search of candidate word strings.

SUMMARY OF THE INVENTION

The object of the present invention is to provide a method for quickly generating candidate word strings without expanding the word strings. This method comprises the steps of: (A) determining an associated maximum string score for each node; (B) sorting all nodes by their associated maximum string scores to group the nodes with the same string score into the same node set; and, (C) selecting the node sets with relative high string scores generated in step (B), so as to connect the nodes by their starting time frame and ending time frame, thereby generating the candidate word strings.

Other objects, advantages, and novel features of the invention will become more apparent from the following detailed description when taken in conjunction with the accompanying drawings.

BRIEF DESCRIPTION OF THE DRAWINGS

FIG. 3 illustrates the node sets for the candidate word strings in FIG. 1;

DETAILED DESCRIPTION OF THE PREFERRED EMBODIMENTS

Figure 1:
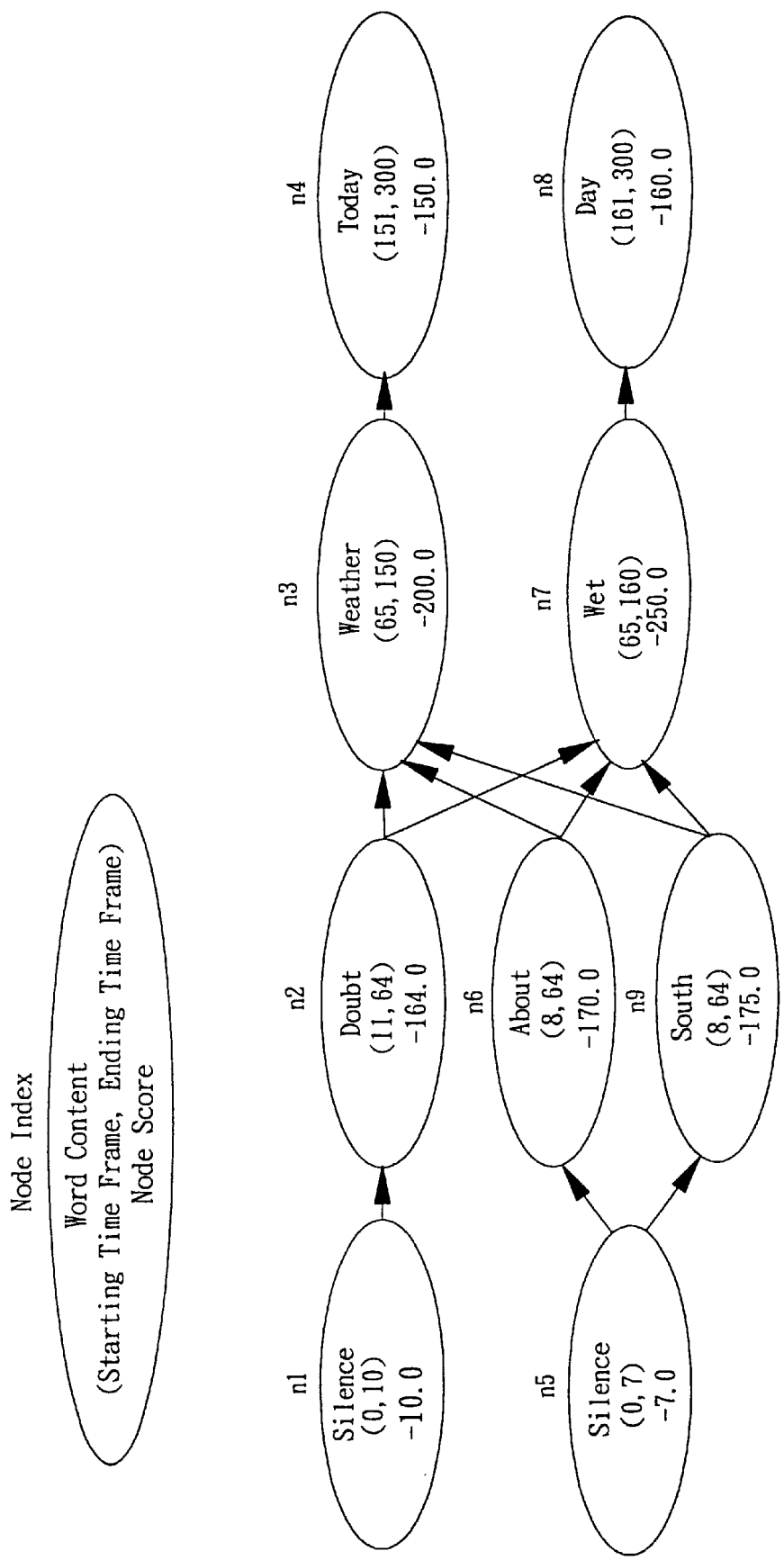
FIG. 1 shows a portion of nodes of a word lattice employed in the method for generating candidate word strings.

To demonstrate the method for generating candidate word strings in speech recognition in accordance with the present invention, an example is given for the search of candidate word strings. In this example, the word is used as the recognition unit. FIG. 1 shows a portion of nodes of a word lattice. Each of the nodes n1 to n9 includes word content, starting time frame, ending time frame, and the node score for the corresponding speech signal. The connections among nodes, n1 to n9, form the possible word strings, for example, n1-n2-n3-n4, n5-n9-n7-n8, or n5-n6-n3-n4. A complete word string is defined as a connection from the starting time frame (where the speech signal always starts from 0) to the ending time frame of the speech signal. In this example, the ending time frame is 300. Furthermore, the string score of a word string is the summation of the scores of all the nodes in the word string.

Figure 2:
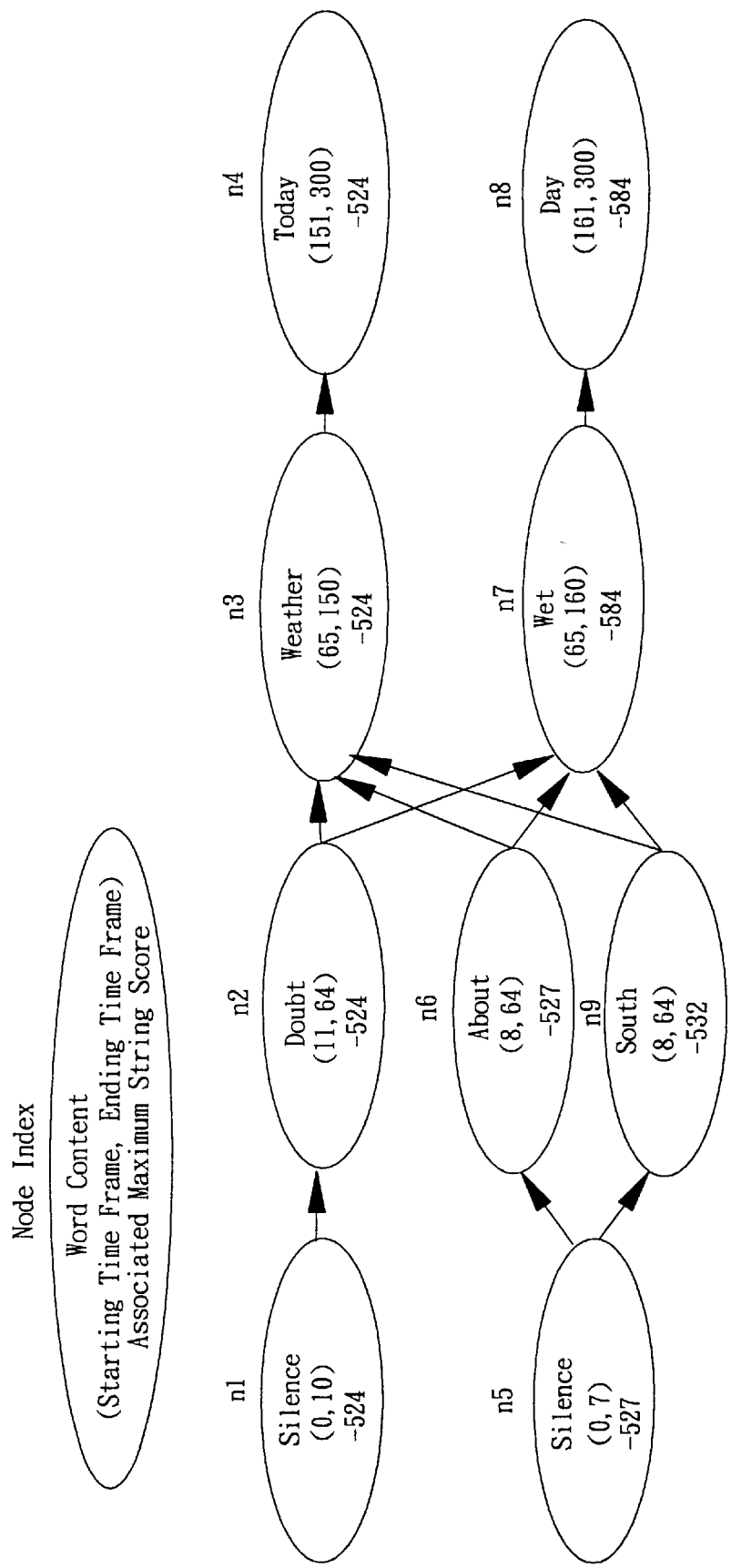
FIG. 2 shows the associated maximum string scores for the nodes in FIG. 1.

For each node shown in FIG. 1, the following characteristics are followed: (1) If the node $n_i$ is one of the components in the best word string, the string score of the best word string is the summation of three scores—the maximum partial string score on the left-hand side of $n_i$, the node score of $n_i$, and the maximum partial string score on the right-hand side of $n_i$; and (2) The associated maximum string scores obtained from each node $n_i$ in the best word string are equivalent through the string score computation. In FIG. 2, the word string n1-n2-n3-n4 is the best word string in this case, and the string score of this word string is −524. Also, the associated maximum string score obtained from any node (e.g., n1, n2, n3, or n4) is −524.

For the nodes that are not in the best word string, there are still other word strings that include these nodes. And, another point can be found that the associated maximum string scores of the nodes that are not in the best word string will be equivalent if their associated word strings are identical. By using the characteristic (1), the associated maximum string score for each node in FIG. 1 can be obtained. Therefore, as shown in FIG. 2, the method of the present invention first determines the associated maximum string scores for all of nodes. Then, the method sorts all nodes by their associated maximum string scores. As shown in FIG. 3, the nodes are grouped into the same node set if their associated maximum string scores are identical to each other. The candidate word strings can be obtained from the front plurality of node sets with different string scores by the connection of their starting and ending time frames as detailed hereinafter.

Figure 4:
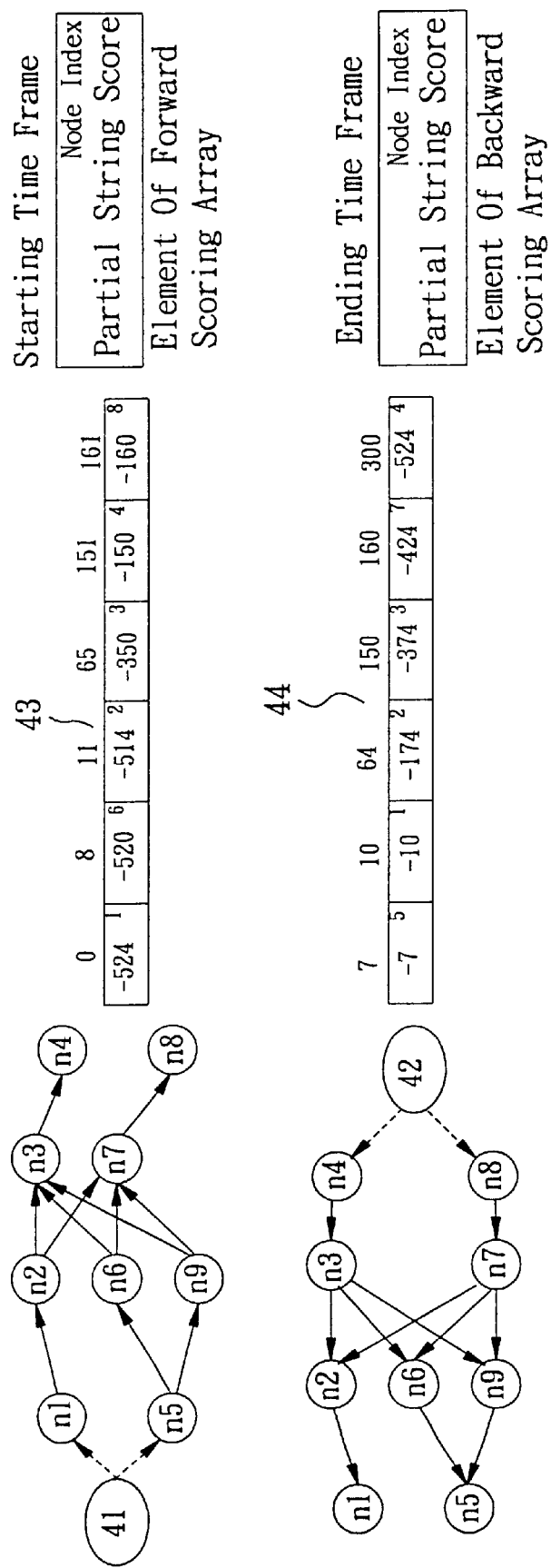
FIG. 4 schematically illustrates the use of dummy nodes and forward/backward scoring arrays to store the maximum partial string scores.
Figure 5:
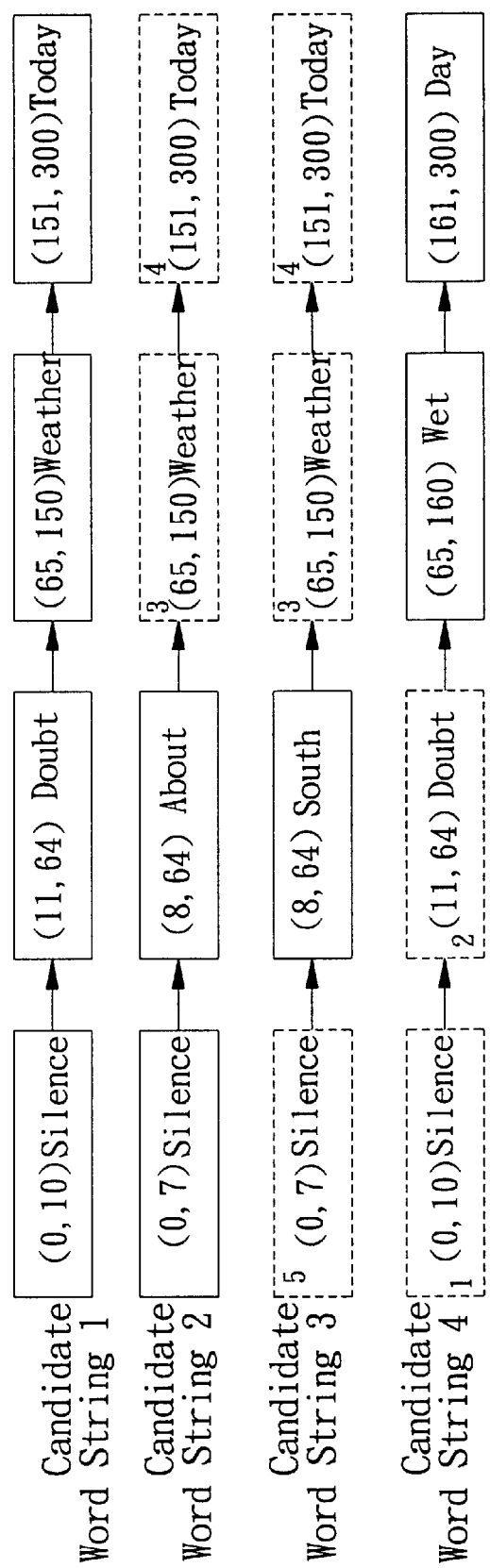
FIG. 5 schematically illustrates the combinations and output of candidate word strings generated by the present method.
Figure 6:
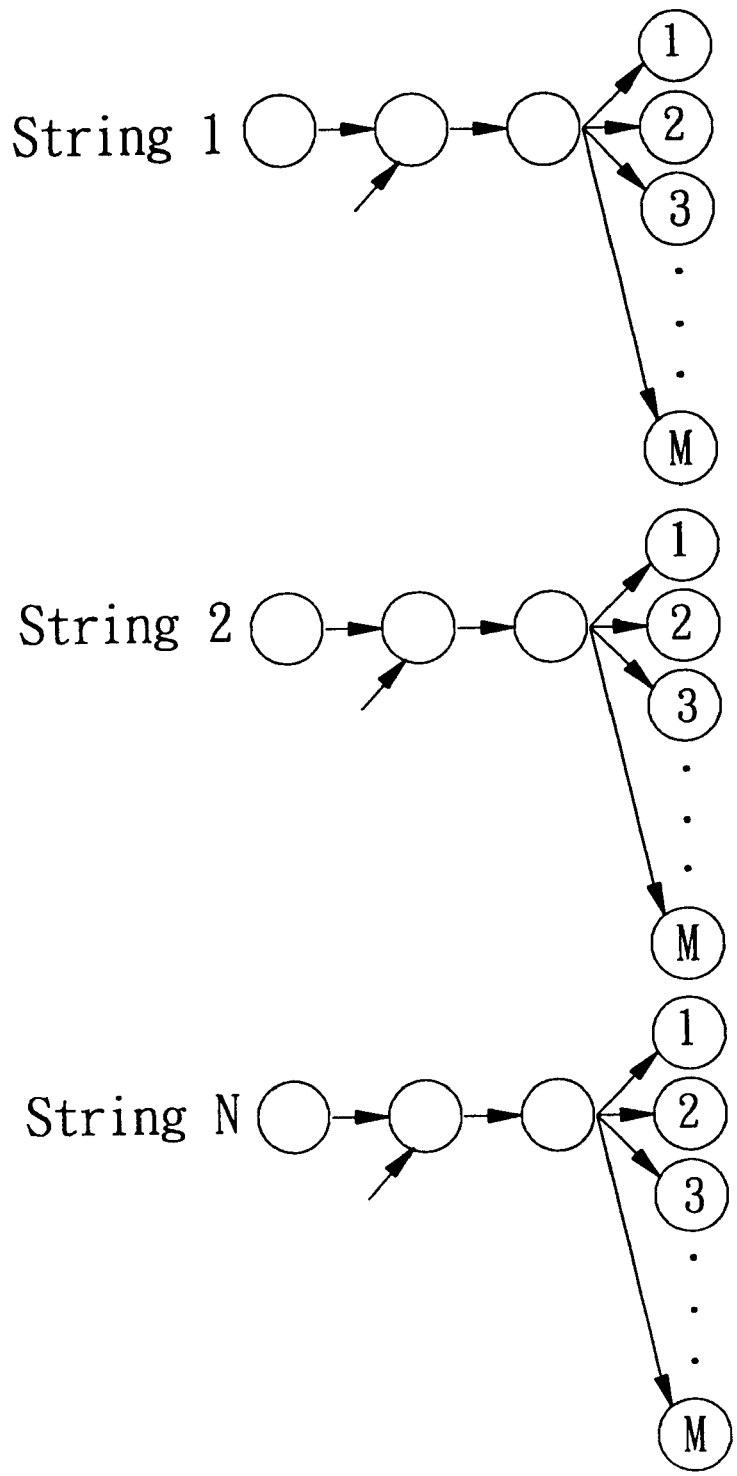
FIG. 6 schematically illustrates the conventional method for generating candidate word strings.

In the calculation of the associated maximum string score for each node, it is implemented by searching the maximum partial string scores on the left-hand side and right-hand side of each node. For example, for the node n2 in FIG. 1, in order to obtain the maximum partial string score on the right-hand side of node n2, it is required to determine the maximum partial string score after frame 64. Similarly, in order to obtain the maximum partial string score after frame 64, it is required to determine the maximum partial string scores after frames 150 and 160, respectively. Such a recursive process is performed until the end of the speech signal, and the maximum partial string score on the right-hand side of node n2 can be obtained. This can be achieved as shown in FIG. 4, wherein two dummy nodes 41 and 42 are created in the front and the rear of the nodes, respectively. A recursive search is performed from the dummy nodes 41 and 42, and the forward scoring array 43 and the backward scoring array 44 are provided to store the maximum partial string scores for the starting and ending time frames of nodes n1 to n9. That is, the forward scoring array 43 is provided to store the maximum partial string scores that are obtained by searching from the starting time frames of nodes n1 to n9 to the end of the speech signal, and to store the indices of nodes that have the maximum partial string scores. Similarly, the backward scoring array 44 is provided to store the maximum partial string scores that are obtained by searching from the ending time frames of nodes n1 to n9 to the beginning of the speech signal, and to store the indices of nodes that have the maximum partial string scores. Hence, the maximum partial string scores for both sides of a specific node can be determined by simply looking up the forward scoring array 43 and the backward scoring array 44. Thus, it is easy to determine the maximum string scores for all nodes in FIG. 1, thereby obtaining the result as shown in FIG. 2.

For the output of candidate word strings, it can be facilitated by the node indices stored in the forward/backward scoring arrays. Because the node index is used to record the node with the maximum partial string score, it is able to quickly connect the nodes and form the complete word string by referencing the node indices. For example, the node set 2 in FIG. 3, the partial word string can be constructed by node n5 (i.e., silence) and node n6 (i.e., about). But the content in the region from frame 65 to 300 has not been determined. To complete the connection, first, the node index 3 is obtained from frame 65 of the forward scoring array 43 in FIG. 4; that is, the word 'weather' and the starting and ending time frames (65, 150) of the node n3. Then, the node index 4 is obtained from frame 151 of forward scoring array 43; that is, the word 'today' and the starting and ending time frames (151, 300) of the node n4. Accordingly, the word string consisting of 'silence', 'about', 'weather', and 'today' is obtained. Similarly, as shown in FIG. 3, in the node set 4, the partial word string 'wet day' can be obtained by the nodes n7 and n8. But the connection from frame 0 to 64 has not been established. To complete the connection, first, the node index 2 is obtained from frame 64 of the backward scoring array 44 in FIG. 4; that is, the word 'doubt' and the starting and ending time frames (11, 64) of the node n2. Then, the node index 1 is obtained from frame 10 of the backward scoring array 44; that is, the word 'silence' and the starting and ending time frames (0, 10) of the node n1. Accordingly, the word string consisting of 'silence', 'doubt', 'wet', and 'day' is obtained.

In view of the foregoing, it is known that the method of the present invention is provided to obtain the associated maximum string score for each node, and sort the nodes by their associated maximum string scores for obtaining the candidate word strings. The expansion of word strings can be avoided, and thus, the processing time and the memory requirement are significantly reduced. Moreover, the subsequent processes in a spoken dialogue system, such as speech verification and language understanding, may use the number of candidate word strings to control their processing time and the corresponding recognition accuracy by the method of the present invention.

The following table 1 is provided to illustrate an example for giving the relation among the number of candidate word strings, inclusion rate and word density.

TABLE 1

| Number of word strings | Inclusion rate | Word density |
| --- | --- | --- |
| 10 | 96.44% | 6.05 |
| 20 | 97.47% | 10.97 |
| 30 | 97.93% | 15.72 |
| 40 | 98.16% | 20.28 |

TABLE 1-continued

| Number of word strings | Inclusion rate | Word density |
|---|---|---|
| 50 | 98.33% | 24.62 |
| ∞ | 98.85% | 130.33 |

In this example, 500 spoken utterances for weather inquiry domain, recorded by 10 males and 10 females, are used for testing, where '∞' denotes the case for the full selections of candidate word strings. Although the inclusion rate is 98.85% for the case of full selections, the word density is as high as 130.33. After decreasing the number of candidate word strings to 50, the word density is reduced to 24.62, which is about one-fifth of the case of full selections, and the inclusion rate is 98.33%, which is reduced only by 0.52%. When the number of candidate word strings is decreased, the word density and the inclusion rate are also decreased. The selection for the number of candidate word strings is a trade off computation time, memory space, and correctness, which can be controlled by the post-processing modules.

Although the present invention has been explained in relation to its preferred embodiment, it is to be understood that many other possible modifications and variations can be made without departing from the spirit and scope of the invention as hereinafter claimed.

What is claimed is:

1. A method for generating at least one candidate word string in speech recognition, the candidate word string having a plurality of connected nodes in a word lattice or a syllable lattice, each node having a node score, a starting time frame and an ending time frame, the candidate word string having a string score obtained by summing the node scores of all nodes in the candidate word string, the method comprising the steps of:

(A) determining an associated maximum string score for each node;
   (B) sorting all nodes by their associated maximum string scores to group the nodes with the same string score into a same node set; and
   (C) selecting the node sets with relative high string scores generated in step (B), so as to connect the nodes by their starting time frame and ending time frame, thereby generating the candidate word strings.

2. The method of claim 1, wherein in step (C), if there is a node set incapable of achieving a connection of a complete word string from the nodes thereof, the nodes of the node sets having relative high string scores are used to connect word strings for generating the candidate string.

3. The method of claim 2, wherein, if there is a node set incapable of achieving a connection of a complete word string from the nodes thereof, the node index is used to obtain nodes for connecting word strings in order to generate the candidate word string.

4. The method of claim 1, wherein in step (A), two dummy nodes are created, one in front of the first nodes and one at the end of the last nodes, so as to perform a recursive search starting from each of the dummy nodes for creating a forward scoring array to store maximum partial string scores that are obtained by searching from the starting time frame of a node to an end of a speech signal, and a backward scoring array to store maximum partial swing scores that are obtained by searching from the ending time frame of a node to a beginning of the speech signal, thereby obtaining the associated maximum swing score for each node by a summation of three scores including the maximum partial swing score in a field of next frame of node's ending time frame in the forward scoring array, the maximum partial swing score in a field of previous frame of node's beginning time frame in the backward scoring array, and the node's score.

5. The method of claim 4, wherein each element of the forward scoring array has a node index representing the node with the maximum partial string score.

6. The method of claim 4, wherein each element of the backward scoring array has a node index representing the node with the maximum partial string score.

7. The method of claim 1, wherein each node comprises a content of syllable or word, the starting time frame, the ending time frame, and the node score for a corresponding speech signal.

8. The method of claim 1, wherein the number of the candidate word strings generated in step (C) is controlled by a post-process.

9. The method of claim 1, wherein the candidate word string is formed by connecting the nodes in the word lattice.

10. The method of claim 9, wherein each node comprises a word content, the starting time frame, the ending time frame, and the node score for a corresponding speech signal.

11. The method of claim 1, wherein the candidate word string is formed by connecting the nodes in the syllable lattice.

12. The method of claim 11, wherein each node comprises a syllable content, the starting time frame, the ending time frame, and the node score for a corresponding speech signal.

\* \* \* \* \*